US009718224B2

(12) United States Patent
Franke et al.

(10) Patent No.: US 9,718,224 B2
(45) Date of Patent: Aug. 1, 2017

(54) INJECTION-MOLDED CIRCUIT CARRIER

(71) Applicant: Micronas GmbH, Freiburg (DE)

(72) Inventors: Joerg Franke, Freiburg (DE); Timo Kaufmann, Waldkirch-Suggental (DE); Oliver Breitwieser, Gundelfingen (DE); Klaus Heberle, Emmendingen (DE)

(73) Assignee: TDK-Micronas GmbH, Freiburg (DE)

( * ) Notice: Subject to any disclaimer, the term of this patent is extended or adjusted under 35 U.S.C. 154(b) by 121 days.

(21) Appl. No.: 14/836,196

(22) Filed: Aug. 26, 2015

(65) Prior Publication Data

US 2016/0061634 A1 Mar. 3, 2016

(30) Foreign Application Priority Data

Aug. 26, 2014 (DE) .................... 10 2014 012 413

(51) Int. Cl.
*H01L 21/00* (2006.01)
*B29C 45/00* (2006.01)
*B29L 31/34* (2006.01)

(52) U.S. Cl.
CPC ....... *B29C 45/00* (2013.01); *B29L 2031/3493* (2013.01)

(58) Field of Classification Search
CPC .................... B29C 45/00; B29L 2031/3493
See application file for complete search history.

(56) References Cited

U.S. PATENT DOCUMENTS

2009/0079054 A1* 3/2009 Asai .................. B81B 7/0038
257/682

FOREIGN PATENT DOCUMENTS

JP H 06-349979 A 12/1994
JP 2008-041817 A 2/2008

* cited by examiner

*Primary Examiner* — Richard Booth
(74) *Attorney, Agent, or Firm* — Muncy, Geissler, Olds & Lowe, P.C.

(57) ABSTRACT

An injection-molded circuit carrier is provided that has an outside and an underside and an inner base region and a frame. The frame has an inside and a cover surface, so that the inner base region is enclosed in the manner of a frame, and multiple printed conductors are provided, which are spaced a distance apart. The printed conductors are guided at least partially from the inside to the underside via the cover surface and via the outside so that at least two metal surfaces are formed on the underside, which are each electrically connected to a printed conductor and are spaced a distance apart. The metal surfaces are designed to be significantly wider than the printed conductors for the purpose of forming a capacitive sensor.

8 Claims, 2 Drawing Sheets

INJECTION-MOLDED CIRCUIT CARRIER

This nonprovisional application claims priority to German Patent Application No. 10 2014 012 413.4, which was filed on Aug. 26, 2014, and which is herein incorporated by reference.

BACKGROUND OF THE INVENTION

Field of the Invention

The invention relates to an injection-molded circuit carrier.

Description of the Background Art

An injection-molded circuit carrier having a semiconductor body is known from JP 2008 04 1817 A. The terminals for the integrated circuit are guided on the outside of the circuit carrier to the underside for the purpose of facilitating a contacting of the circuit carrier. It should be noted that the injection-molded circuit carrier is also known as a "molded interconnect device" or "MID", and the semiconductor body, which is designed as a bare die, is also known as a "die."

SUMMARY OF THE INVENTION

It is therefore an object of the invention to provide a device which refines the conventional art.

According to an embodiment of the invention, an injection-molded circuit carrier is provided, the circuit carrier having an outside and an underside and an inner base region and a frame, the frame having an inside and a cover surface, so that the inner base region is enclosed in the manner of a frame, and multiple printed conductors being provided, which are spaced a distance apart, and the printed conductors being guided at least partially from the inside to the underside via the cover surface and via the outside, so that at least two metal surfaces are formed on the underside, which are each electrically connected to a printed conductor and are spaced a distance apart, the metal surfaces being designed to be significantly wider than the printed conductors for the purpose of forming a capacitive sensor.

The printed conductors can be formed after the manufacture of the circuit carrier, which is made of a plastic. The location and number of printed conductors may be easily set. Also, the circuit carrier can be formed as a single piece.

An advantage of the device according to an embodiment of the invention is that capacitive proximity switches may be easily manufactured with the aid of the circuit carrier and the trough-shaped formation and the large metal surfaces on the underside. Proximity switches of this type are used, among other things, in automotive engineering.

A semiconductor body, which has an integrated circuit formed on its surface, can be arranged in the trough-shaped formation, i.e., on the inner base area. The integrated circuit can connect the contact surfaces formed on the semiconductor body to the printed conductors with the aid of bond wires or with the aid of a flip-chip connection and thereby establishes an electrical, operative connection to the sensor surface on the underside. The semiconductor body can be arranged in such a way that it faces downward, i.e., with its surface oriented toward the inner base region. A height of the frame can be greater than a thickness of the semiconductor body.

In an embodiment, the trough-shaped formation can be filled with a molding compound, also referred to as a mold compound. It is advantageous if the surface of the molding compound forms a planar surface with the cover surface of the frame. It is advantageous that the semiconductor body is largely protected against environmental influences after molding.

In an embodiment, the frame can have a quadrilateral and circumferentially closed design.

In an embodiment, the metal surfaces and assigned printed conductors can be formed as a single piece. Studies have shown that it is sufficient if at least one printed conductor is not guided to the underside via the side surface. In particular, all supply voltage-conducting printed conductors for an internal integrated circuit are provided, at maximum, only up to the side surfaces.

In an embodiment, four metal surfaces, which are spaced a distance apart, are formed on the underside, it being preferred to design the metal surfaces a parts of a circle. In particular, it is advantageous, if only two metal surfaces are provided, to design the individual metal surfaces as semicircles and, in an arrangement with four metal surfaces, to correspondingly design the metal surfaces as quadrants. It is understood that the metal surfaces are electrically insulated from each other, at least on the underside but preferably overall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
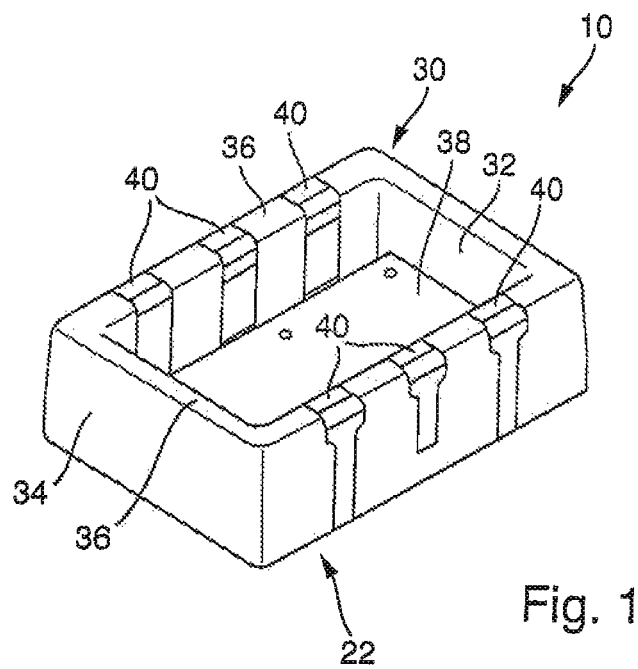
FIG. 1 shows a perspective view of an exemplary embodiment according to the invention.

The illustration in FIG. 1 shows a perspective view of one specific embodiment according to the invention, including a one-piece, injection-molded circuit carrier 10. Circuit-carrier 10 has an underside 22 and a circumferential frame 30, so that circuit carrier 10 forms a trough-like or box-shaped formation.

Circuit carrier 10 has an inside 32 and an outside 34. Frame 30 has a cover surface 36. The trough-shaped formation results in a frame-like, enclosed inner base region, which is not illustrated. A semiconductor body 38, having an integrated circuit formed on the surface can be arranged in the base region with the surface facing downward and oriented toward the base region.

Circuit carrier 10 furthermore includes multiple printed conductors 40, which are spaced a distance apart, printed conductors 40 being guided at least partially from inside 32 to underside 22 via cover surface 36 and via outside 34.

Figure 2A:
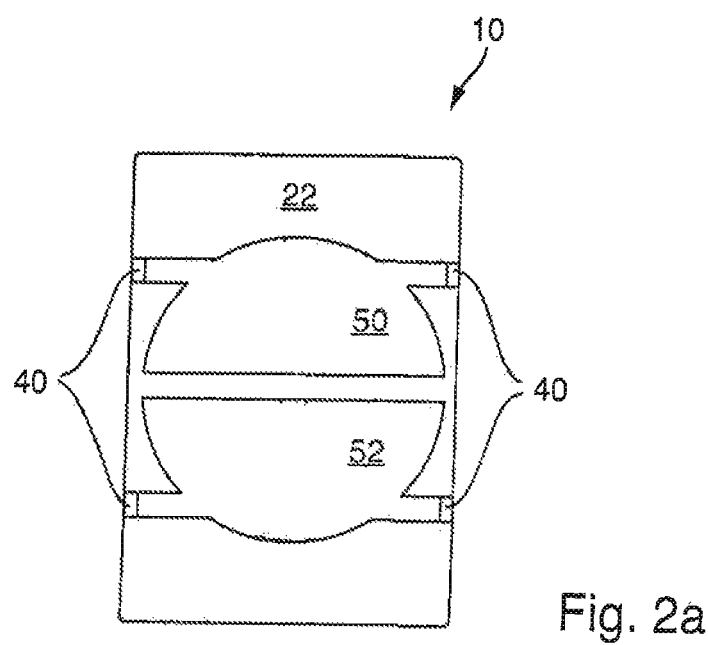
FIG. 2a shows a top view of the underside of the specific embodiment from FIG. 1 in a configuration.

The illustration in FIG. 2a shows a top view of the underside of the specific embodiment from FIG. 1 in a first configuration. Only the differences from the illustration in FIG. 1 are explained below. To form a capacitive sensor, two metal surfaces 50 and 52 are formed on underside 22, which are each electrically connected to a printed conductor 40 and spaced a distance apart. Metal surfaces 50 and 52 are formed as semicircles and are significantly wider than printed conductors 40. In the present case, metal surfaces 50 and 52 are each connected from two opposite sides. In one specific embodiment, which is not illustrated, it is sufficient to connect the two metal surfaces 50 and 52 on only one side.

Figure 2B:
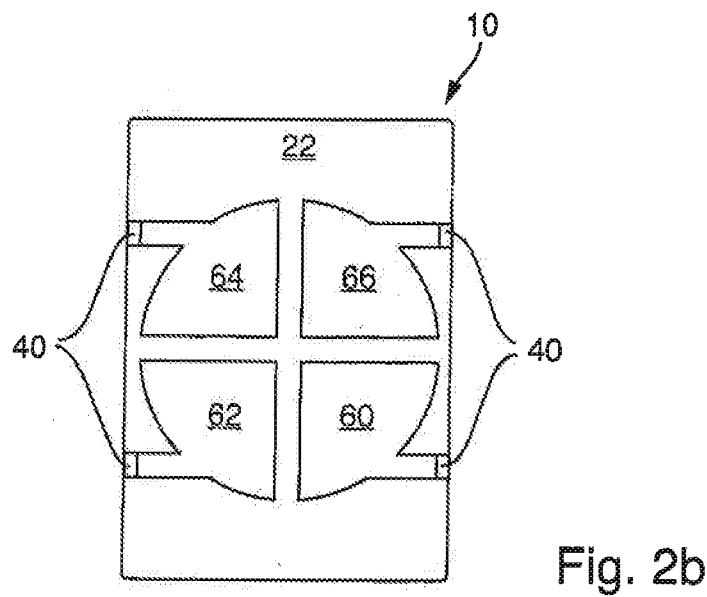
FIG. 2b shows a top view of the underside of the specific embodiment from FIG. 1 in a configuration.

The illustration in FIG. 2b shows a top view of the underside of the specific embodiment from FIG. 1 in a second configuration. Only the differences from the illustration in FIG. 1 and the configuration illustrated in FIG. 2a are explained below. Four metal surfaces 60, 62, 64 and 66 are each designed as a quadrant and connected to a printed conductor 40 as a single piece.

Figure 2C:
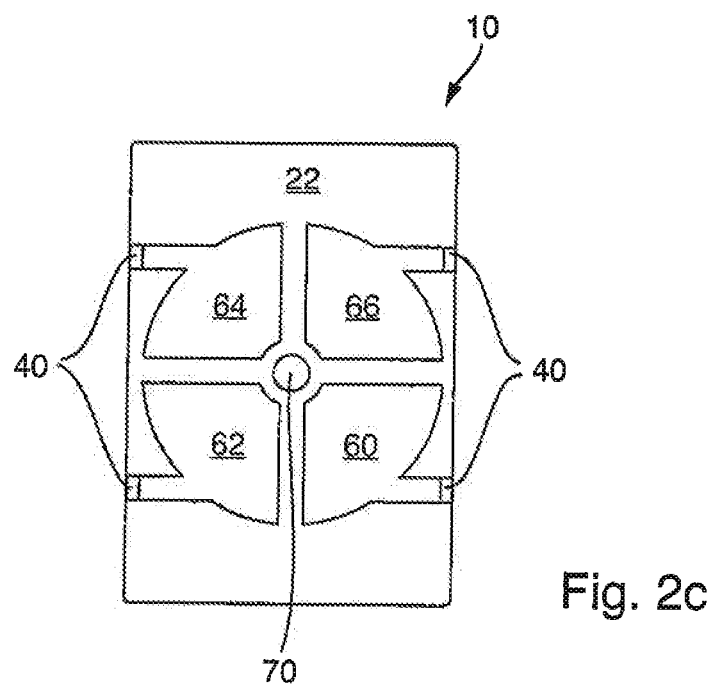
FIG. 2c shows a top view of the underside of the specific embodiment from FIG. 1 in a configuration.

The illustration in FIG. 2c shows a top view of the underside of the specific embodiment from FIG. 1 in a third configuration. Only the differences from the illustration in FIG. 1 and one of the preceding configurations are explained below. Another metal surface 70 is formed in the middle between four metal surfaces 60, 62, 64 and 66, which are designed as quadrants. Metal surface 70 is electrically insulated from metal surfaces 60 through 66, and it is not connected to a printed conductor 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A capacitive sensor comprising:
    an injection-molded circuit carrier, comprising:
        an outside region;
        an underside region;
        an inner base region enclosed by a frame;
        the frame having an inside surface, a cover surface and an outside; and
        a plurality of printed conductors, which are spaced a distance apart, being guided from the inside surface to an underside via the cover surface and via the outside; and
    a semiconductor body being disposed on the base region, the semiconductor body including an integrated circuit, the integrated circuit being electrically operatively connected with the aid of the printed conductors,
    wherein the frame has a quadrilateral and circumferentially enclosed design, and the semiconductor body is designed in the form of a die, and trough-shaped formation is filled with a casting compound so that the semiconductor body is protected to the greatest extent against environmental influences after casting;
    wherein the integrated circuit is electrically operatively connected to sensor surfaces on the underside; and
    at least two sensor surfaces that are each electrically connected to the printed conductor and are spaced a distance apart and are arranged on an underside being wider than the printed conductors to form the capacitive sensor.

2. The capacitive sensor according to claim 1, wherein the surface of the casting compound forms a planar surface with the cover surface of the frame.

3. The capacitive sensor according to claim 1, wherein the sensor surfaces and the assigned printed conductors form a single piece.

4. The capacitive sensor according to claim 1, wherein four metal surfaces, which are spaced a distance apart, are formed on the underside.

5. The capacitive sensor according to claim 1, wherein the sensor surfaces are part of a circle.

6. The capacitive sensor according to claim 1, wherein the sensor surfaces are electrically insulated from each other.

7. The capacitive sensor according to claim 1, wherein contact surfaces designed as semiconductor bodies are connected to the printed conductors with the aid of bond wires or with the aid of a flip connection and are electrically operatively connected hereby to the sensor surfaces on the underside.

8. The capacitive sensor according to claim 7, wherein a height of the frame is greater than a thickness of the semiconductor body.

* * * * *